R. J. BERRYMAN.
APPARATUS FOR MANUFACTURING AND HARVESTING ICE.
APPLICATION FILED SEPT. 21, 1909.
1,046,252.                                    Patented Dec. 3, 1912.
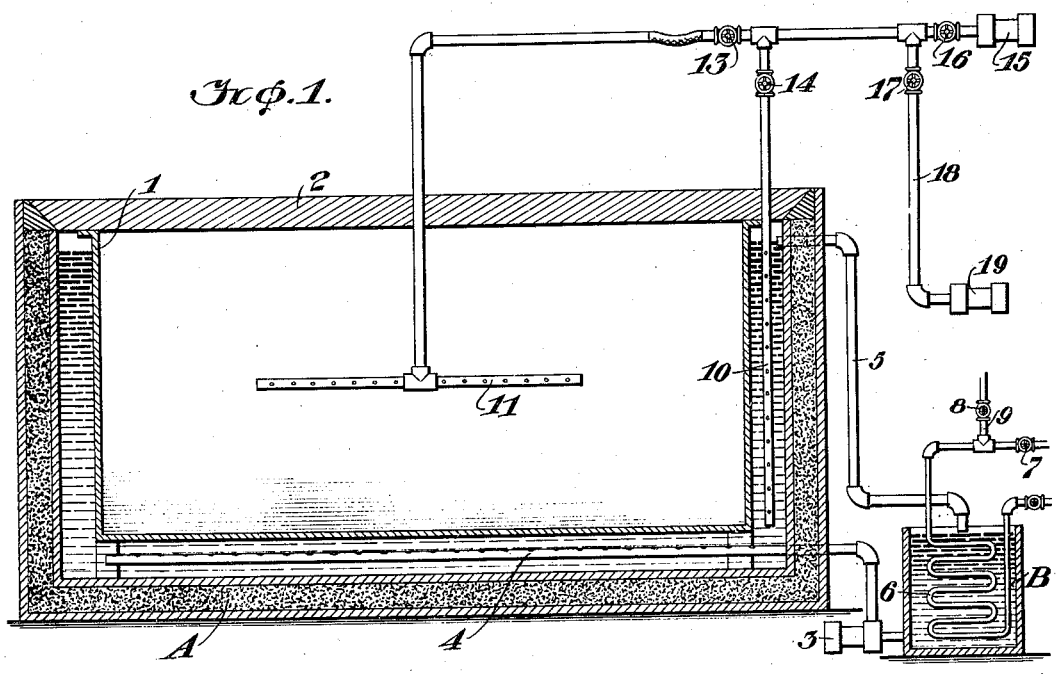
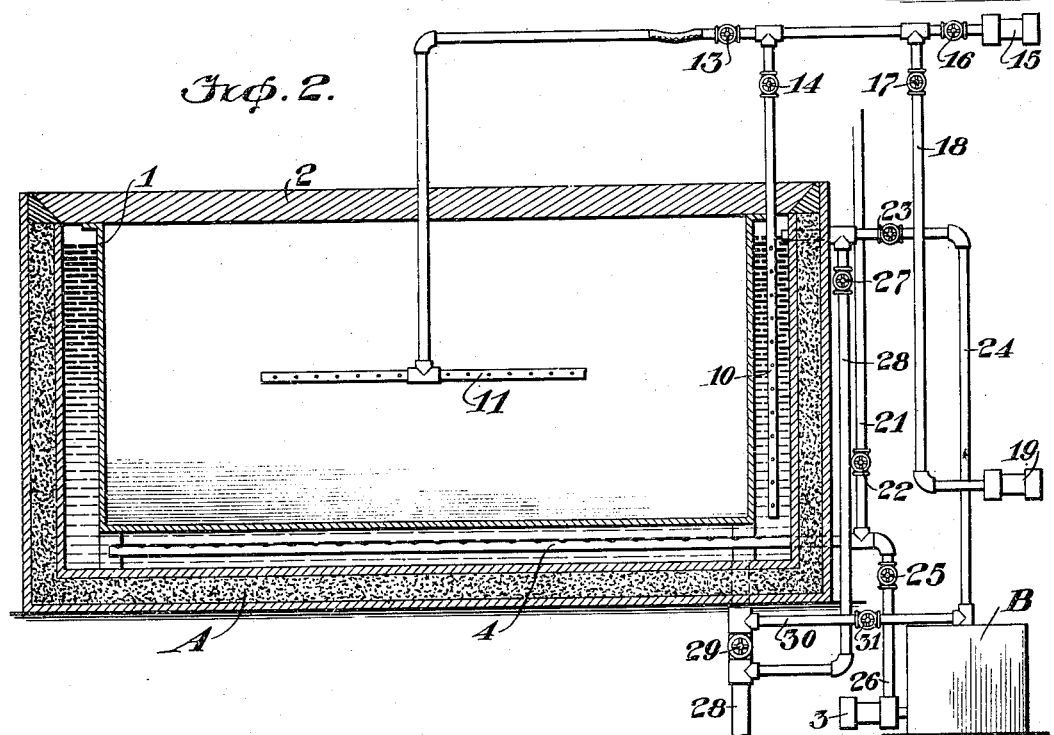

UNITED STATES PATENT OFFICE.

ROBERT JAMES BERRYMAN, OF WASHINGTON, DISTRICT OF COLUMBIA.

APPARATUS FOR MANUFACTURING AND HARVESTING ICE.

1,046,252.  Specification of Letters Patent. Patented Dec. 3, 1912.

Application filed September 21, 1909. Serial No. 518,848.

*To all whom it may concern:*

Be it known that I, ROBERT J. BERRYMAN, a citizen of the United States, residing at Hotel Buckingham, city of Washington, in the District of Columbia, have invented certain new and useful Improvements in Apparatus for Manufacturing and Harvesting Ice, of which the following is a specification.

My invention relates to an improvement in apparatus for manufacturing and harvesting ice, and the object is to provide simple mechanism for causing the freezing of the ice in cans or molds, and for facilitating the subsequent removal of the ice from said cans or molds without disturbing the latter.

With the foregoing objects in view, my invention consists in certain novel features of construction and combination of parts which will be hereinafter described and pointed out in the claims.

In the accompanying drawings:—Figure 1 is a sectional view illustrating the process, and Fig. 2 is an illustration of a slight variation in the mode of introducing and disposing of the thawing medium, it being to all intents and purposes the same as is the process illustrated in Fig. 1.

A represents an outer tank; 1 represents one of a series of sheet metal cans therein. The tank is insulated in the customary manner, and a cover 2 is adapted to be placed over it, as shown in Fig. 1.

B is a brine cooler from which the brine is forced by means of a pump 3, into the tank, the brine discharging through a perforated pipe 4 which extends approximately throughout the length of the tank and preferably lies just beneath the longitudinal center of each can where it is adapted to discharge the brine or other freezing medium in close proximity to the can bottom, whence it rises on all sides of the can to the surface. Here an overflow pipe 5 returns the freezing medium to the cooler B, so that it may be re-circulated. Ammonia gas introduced through a coil 6 whereby it is circulated through the brine or other freezing medium, maintains its temperature below freezing point. When the thawing takes place, the valve 7 in the ammonia pipe is closed, and valve 8 in the hot gas pipe 9 is opened, thus substituting for the cold ammonia gas, hot gas whereby to heat the contents of the cooler B, whereupon the pump 3 circulates the hot liquid in place of the freezing liquid until the ice is thawed from the walls of the container or containers.

While the freezing is taking place, an agitation of the water to be frozen as well as the freezing medium is going on by means of the perforated discharge pipe 10 in the container, and the pipe 11 in the tank, the valves 13 and 14 being open for this purpose, and an air pump 15 being provided for supplying the air when the valve 16 is open. These same agitating pipes may be utilized to withdraw the water from the center of the ice, and from the tank, if desired, and in order to do this, the air pump 15 is stopped, the valve 16 is closed, and the valve 17 in pipe 18 is opened, whereby the suction pump 19 is started, and the water is pumped out or withdrawn.

The slight deviation from the foregoing, illustrated in Fig. 2, simply consists in taking the thawing medium from an independent source, as for instance, the waste water from the ammonia condenser through a pipe 21 controlled by valve 22, and when the thawing medium is circulating, the valve 23 in return pipe 24, and valve 25 in pipe 26, are shut, and the valve 27 in pipe 28 is opened, thus permitting the thawing medium to overflow at the top into the drain pipe 28 to the sewer, valves 29 and 31, of course, being closed. When it is desired to entirely remove the thawing medium from the tank, it is drained from the bottom through drain pipe 28 by opening valve 29, and as a preliminary to introducing the thawing medium in order to save all of the brine or freezing medium, it is first removed through the bottom of the tank through pipe 30, after first having opened valve 31 and closed valve 29. In this way, any waste of the brine or freezing medium is prevented, and the thawing medium is supplied and from any source, it all being controlled by proper manipulation of the several valves 23, 25, 27, 29 and 31.

By reason of the location of the perforated pipes as previously mentioned, during the freezing process, the cold brine in turn is discharged almost directly in contact with the bottom of the cans whence it naturally and necessarily rises along the sides and ends of the can or cans to the top, thus tending to cause the plates of ice formed to freeze a uniform thickness by reason of the agitation and circulation and propinquity incident to this arrangement. The same applies also with the thawing medium, thus facilitating and hastening the thawing of the ice away from the cans.

Having fully described my invention, what I claim as new and desire to secure by Letters Patent, is:—

1. In an apparatus for manufacturing and harvesting ice, the combination with a container adapted to receive the water to be frozen, means for applying a refrigerant to the water container, and a pipe extending into the container, said pipe having the double function of conveying air or water, and means for reversing the currents of air or water in said pipe.

2. In an ice-making machine, the combination with a container adapted to receive the water to be frozen, means for applying a refrigerant to the water container, and means for successively introducing and withdrawing air and water into the container and therefrom respectively.

3. In an ice making machine, the combination with a container adapted to receive the water to be frozen, and means for freezing the water, of an agitating pipe extending into the container, and means for utilizing the pipe for successively passing air and water therethrough.

4. In an apparatus for manufacturing and harvesting ice, the combination with a container adapted to receive the water to be frozen, of a pipe extending into the container utilized alternately for discharging air into the container, and for withdrawing water therefrom, and means for applying air pressure or suction to said pipe.

5. In apparatus for manufacturing and harvesting ice, the combination with a container in which the water to be frozen is received, of a pipe adapted to extend into said container, and air and suction pumps connected with said pipe, one forcing air thereinto, and the other for sucking water out of the tank.

6. In an apparatus for manufacturing and harvesting ice, the combination with a container adapted to contain the water to be frozen, of a pipe extending into the container, two independent means, one for forcing air into said pipe, and one for sucking air and water out, and valves for controlling said independent means.

In testimony whereof I affix my signature, in the presence of two witnesses.

ROBERT JAMES BERRYMAN.

Witnesses:
VERNON E. HODGES,
WATTS F. ESTABROOK.